(12) United States Patent
Worth

(10) Patent No.: US 6,790,042 B2
(45) Date of Patent: Sep. 14, 2004

(54) FLOOR COVERING INSTALLATION SIMULATION SYSTEM AND METHOD

(75) Inventor: Liberty R. Worth, Oak Park, IL (US)

(73) Assignee: Milliken & Company, Spartanburg, SC (US)

( * ) Notice: Subject to any disclaimer, the term of this patent is extended or adjusted under 35 U.S.C. 154(b) by 153 days.

(21) Appl. No.: 09/891,746

(22) Filed: Jun. 26, 2001

(65) Prior Publication Data

US 2002/0197586 A1 Dec. 26, 2002

(51) Int. Cl.[7] ............................................. G09B 25/04
(52) U.S. Cl. ....................................................... 434/75
(58) Field of Search .............................. 434/72, 73, 74, 434/75, 79, 80, 78; 446/102, 108

(56) References Cited

U.S. PATENT DOCUMENTS

| | | | | |
|---|---|---|---|---|
| 2,013,741 A | * | 9/1935 | Butler et al. .................. | 434/74 |
| 3,530,984 A | * | 9/1970 | Howard ....................... | 206/483 |
| 3,994,079 A | * | 11/1976 | Mirman ........................ | 434/73 |
| 4,253,259 A | * | 3/1981 | Schaffer et al. ............. | 281/15.1 |
| 4,902,229 A | * | 2/1990 | Pedersen et al. .............. | 434/73 |
| 5,158,295 A | * | 10/1992 | Shilling .................. | 273/157 R |
| 5,228,857 A | * | 7/1993 | Roland ........................ | 434/74 |
| 5,505,620 A | * | 4/1996 | Barlett ........................ | 439/73 |
| 5,666,712 A | * | 9/1997 | Cvetkov ....................... | 29/458 |
| 6,524,107 B1 | | 2/2003 | Brown ......................... | 434/72 |

* cited by examiner

Primary Examiner—Kien T. Nguyen
(74) Attorney, Agent, or Firm—Terry T. Moyer; Daniel R. Alexander

(57) ABSTRACT

A display system and related method permitting a prospective purchaser of floor coverings to engage in the contemporaneous physical manipulation and evaluation of various combinations of surface patterns and/or placement orientations for floor covering tile elements prior to actual installation. Simulated tile elements having surface patterns corresponding to the surface patterns of the actual floor covering tile elements are disposed across a display surface in a releasably attachable manner such that one or more of the simulated tile elements may be rotated or replaced to simulate at least one alternative arrangement.

15 Claims, 10 Drawing Sheets

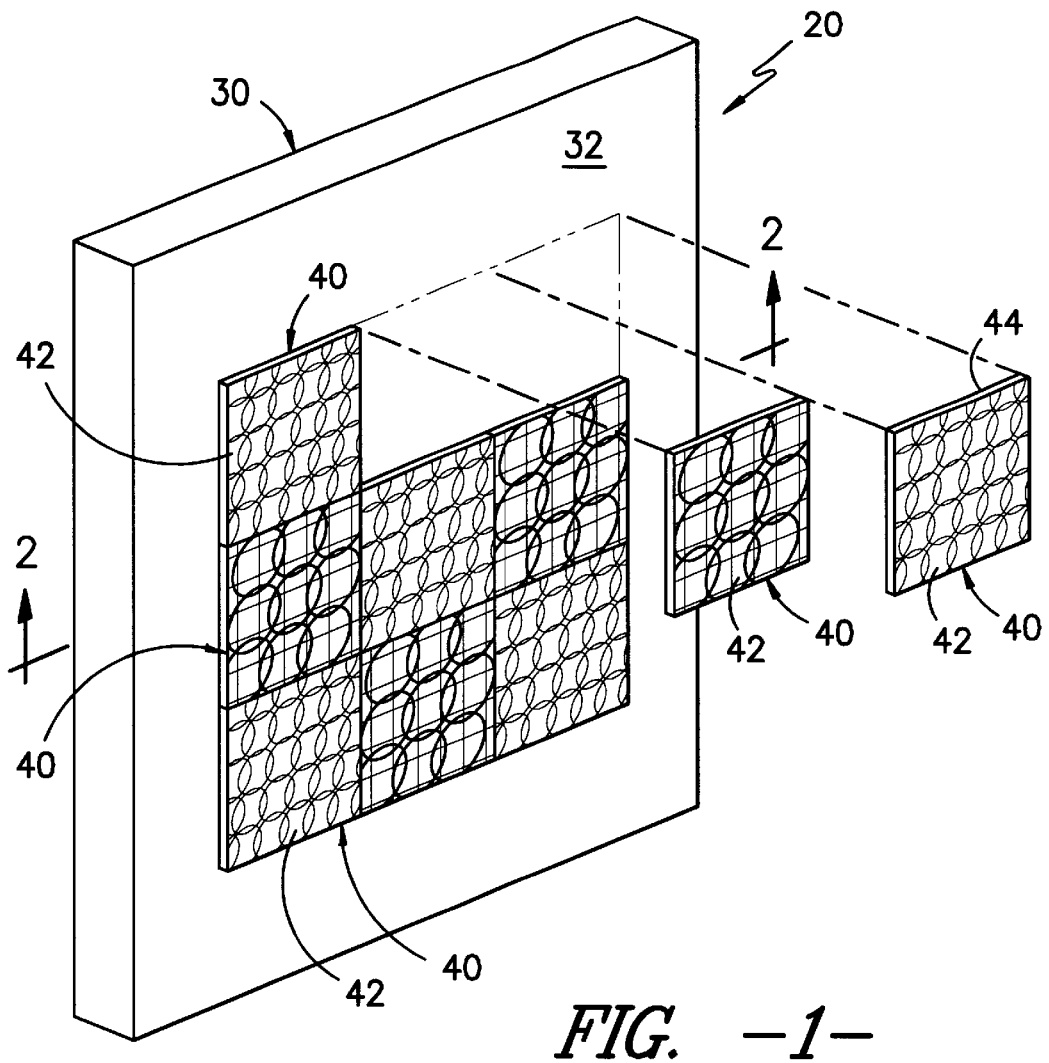
FIG. -1-
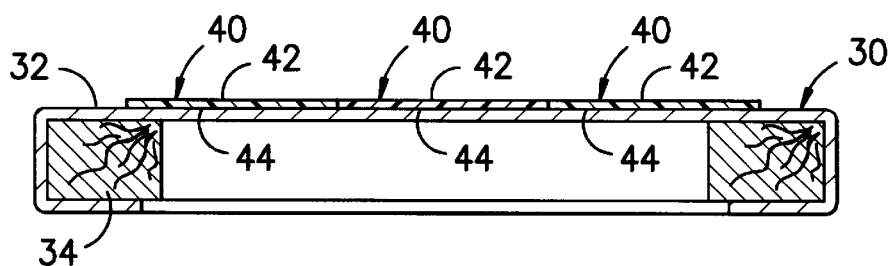
FIG. -2-

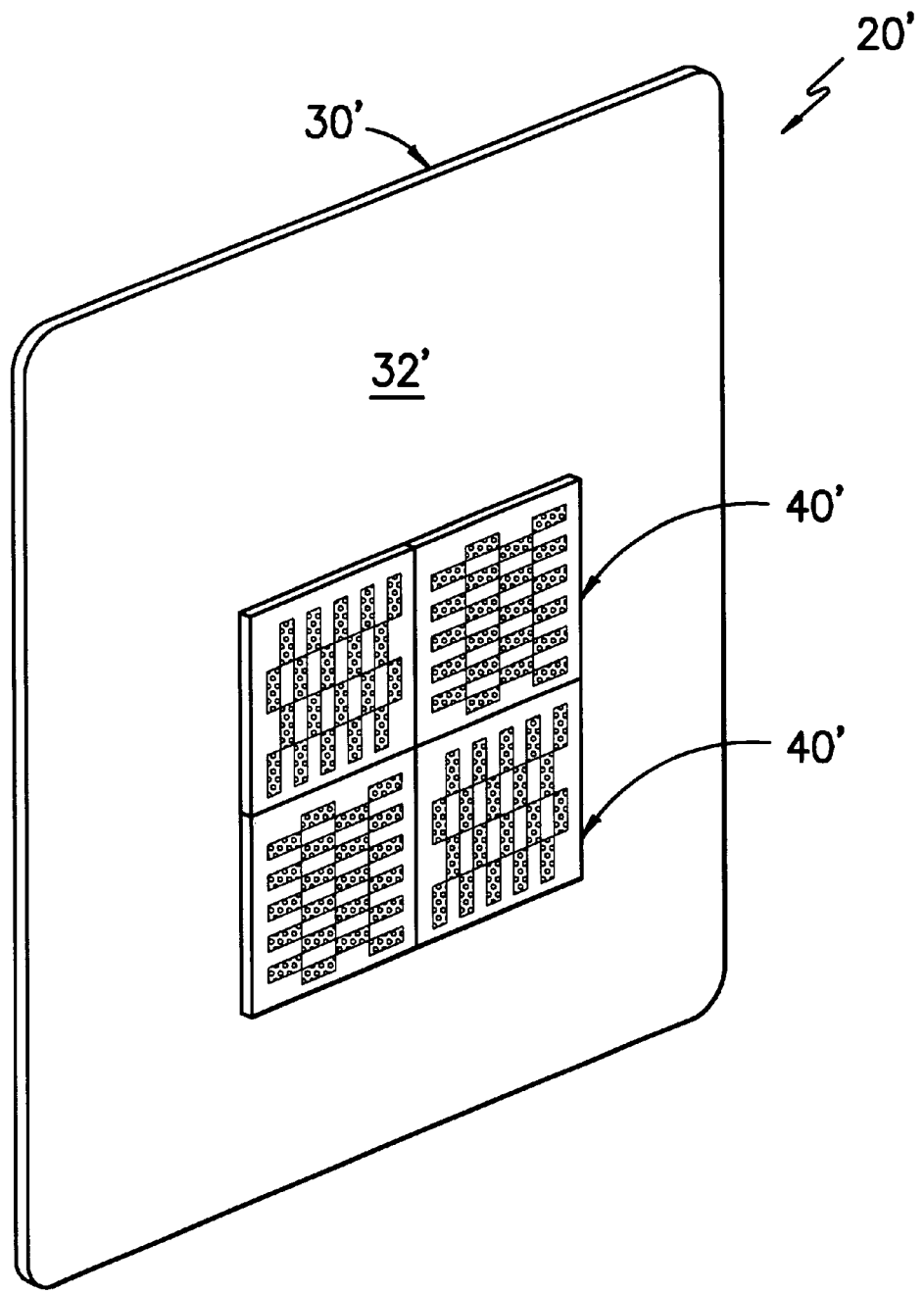
FIG. -3-

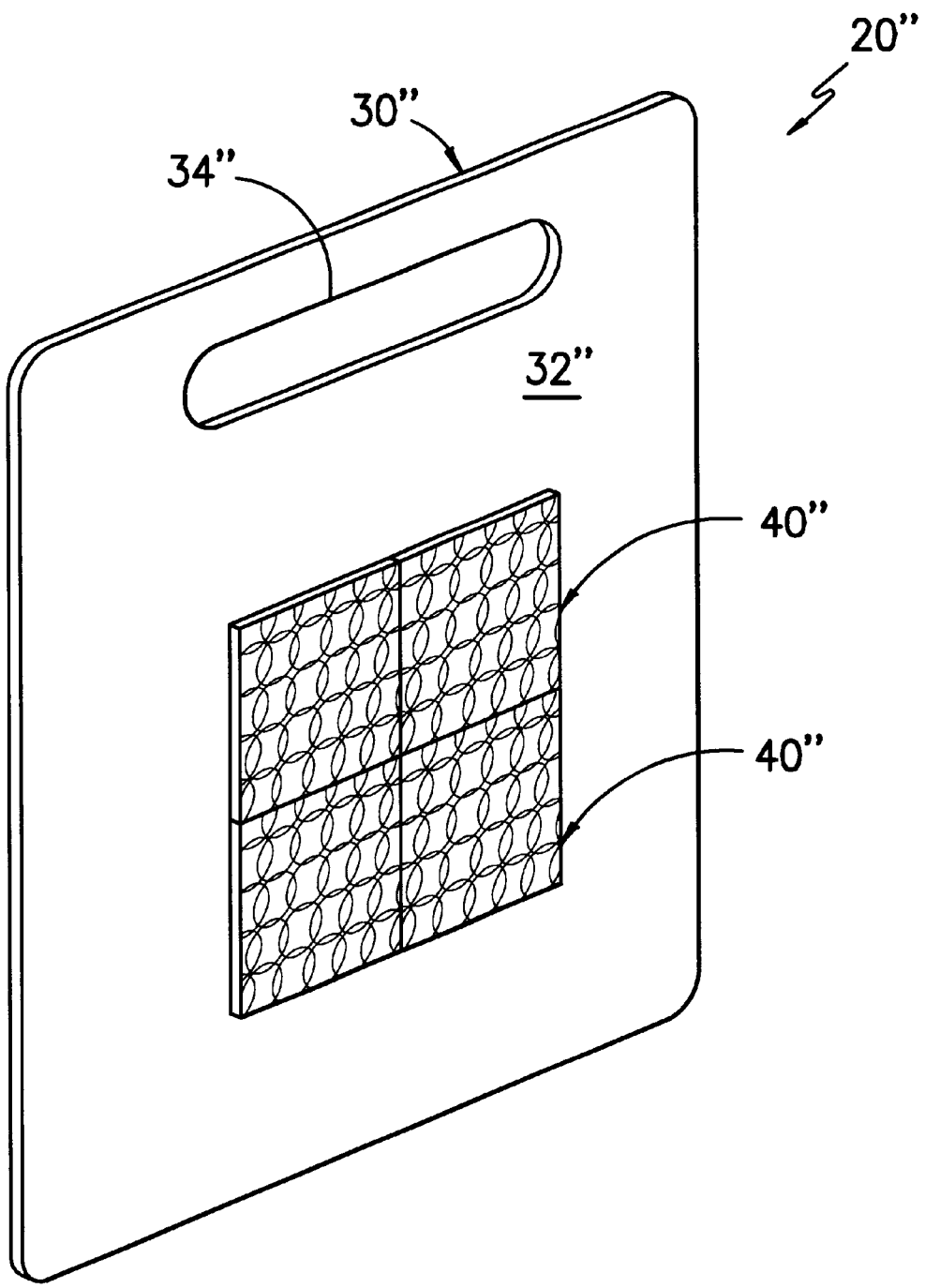
FIG. -4-

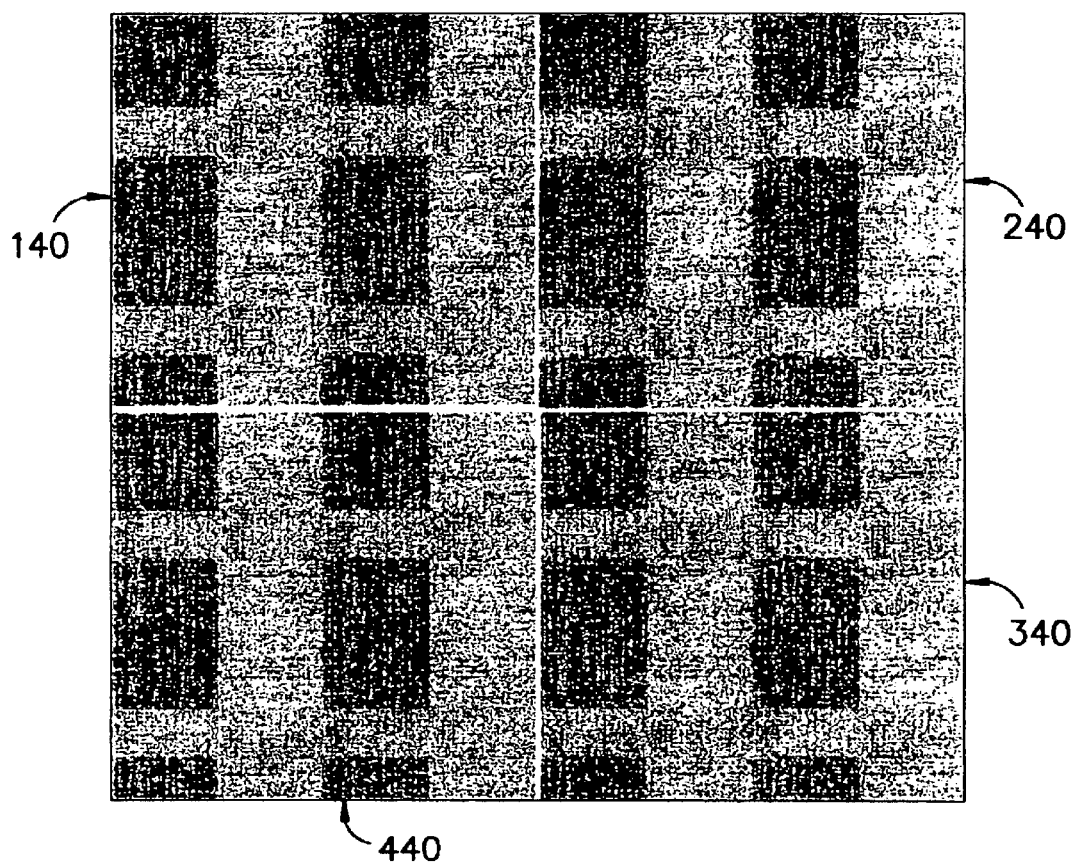
FIG. -5-

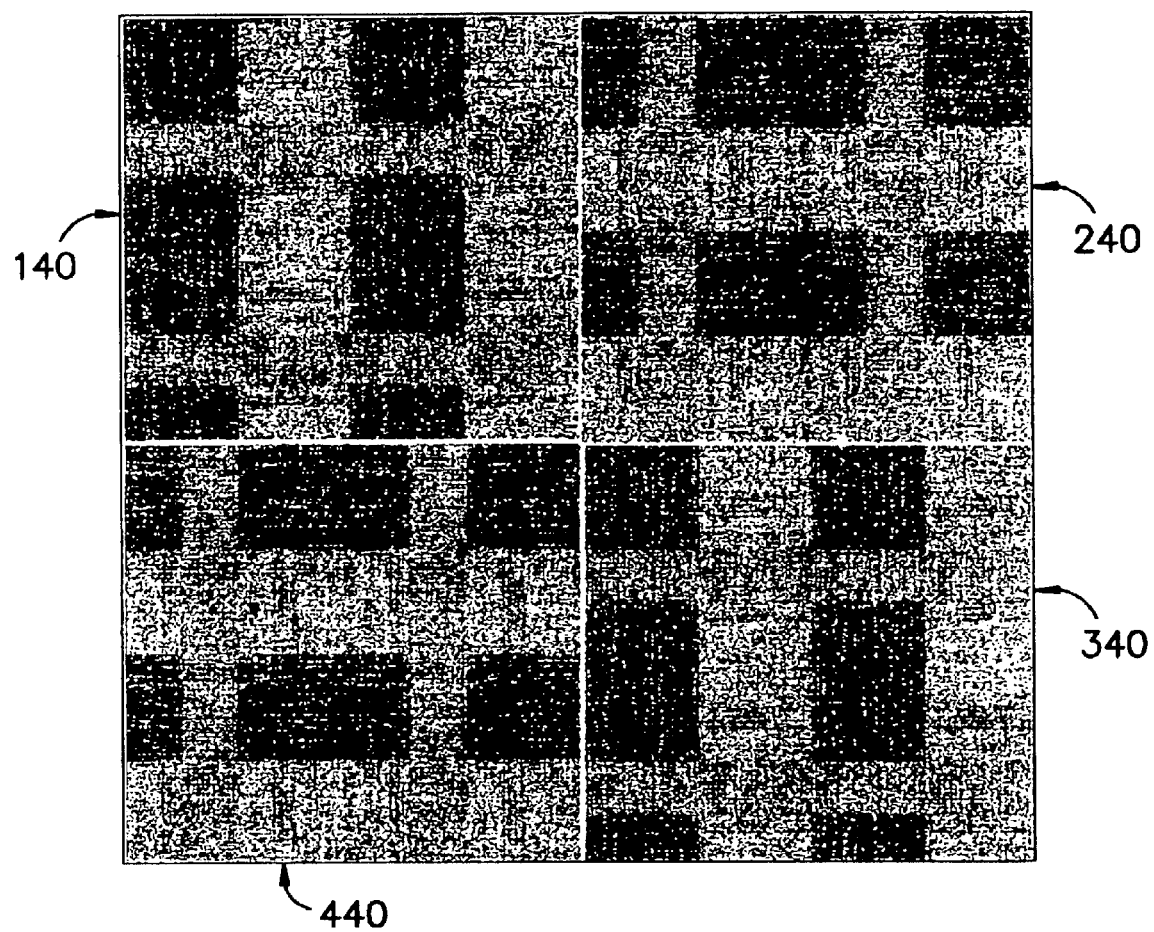
FIG. -6-

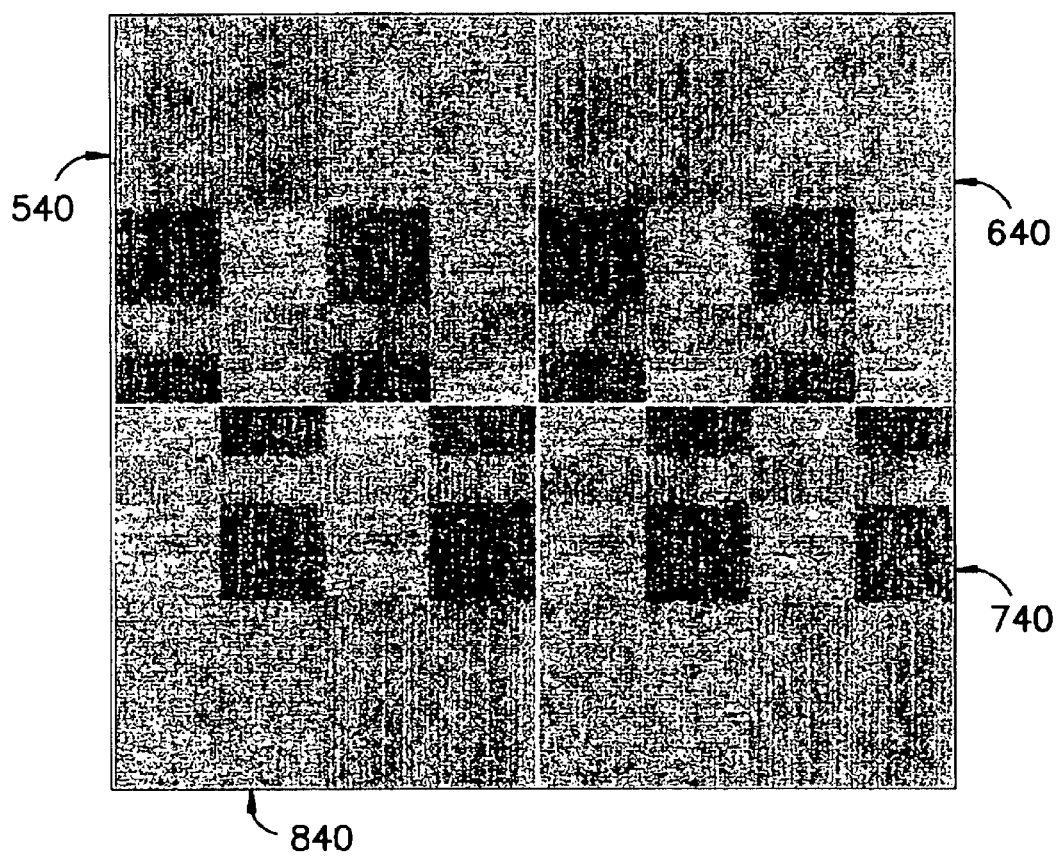
FIG. -7-

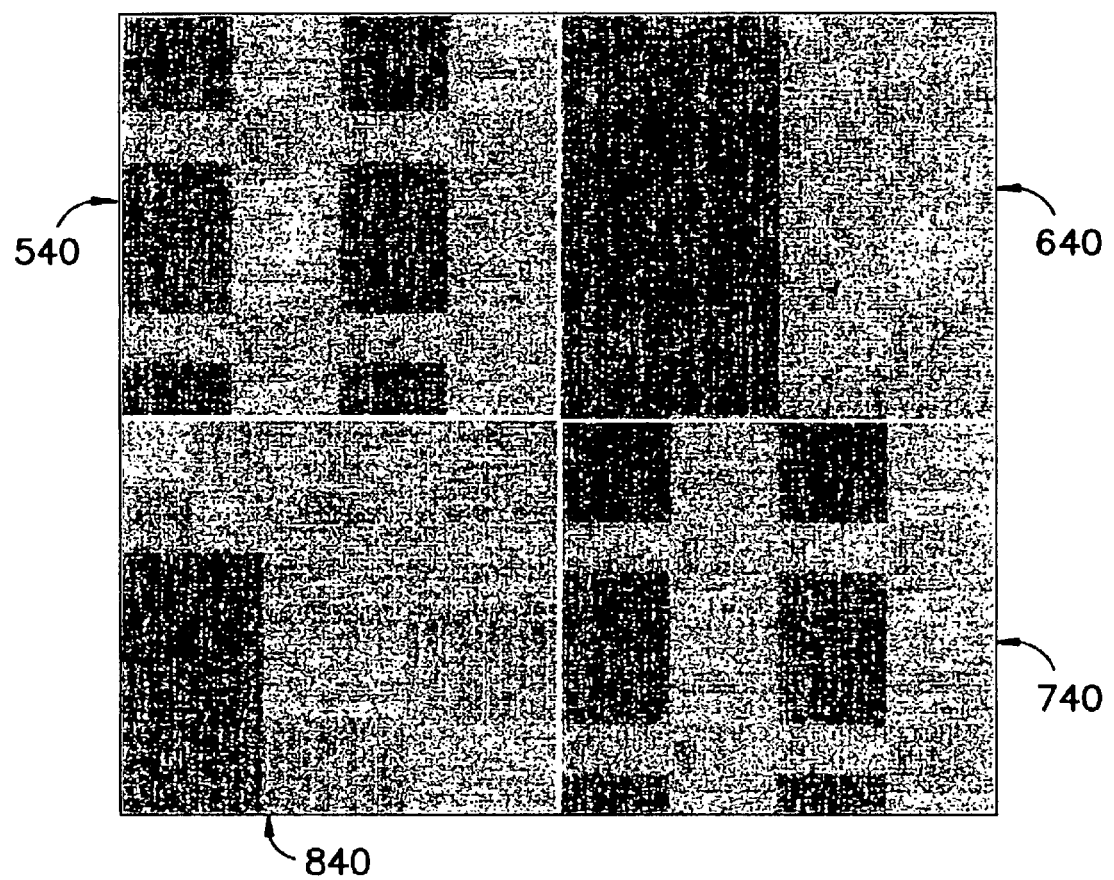
FIG. -8-

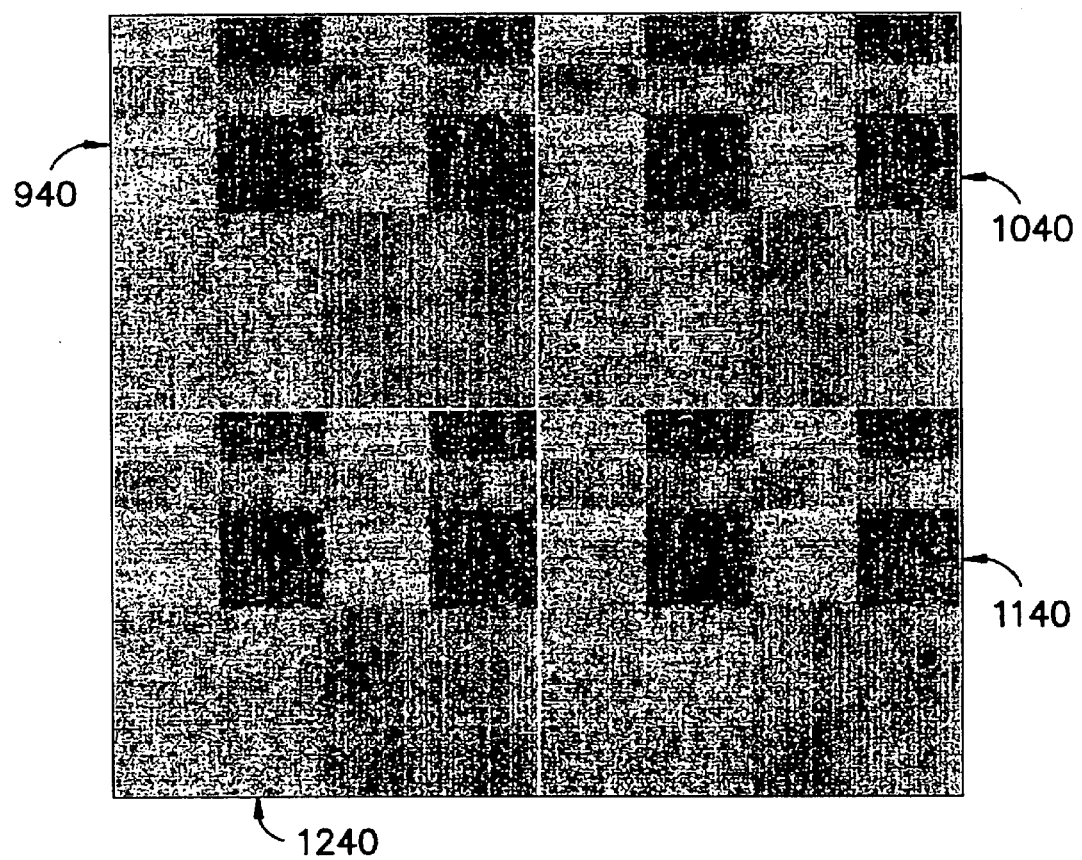
FIG. -9-

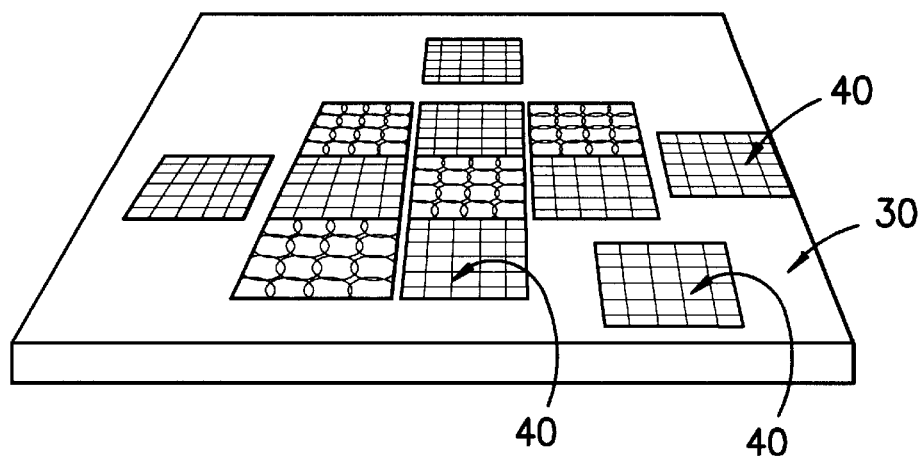
FIG. -10-
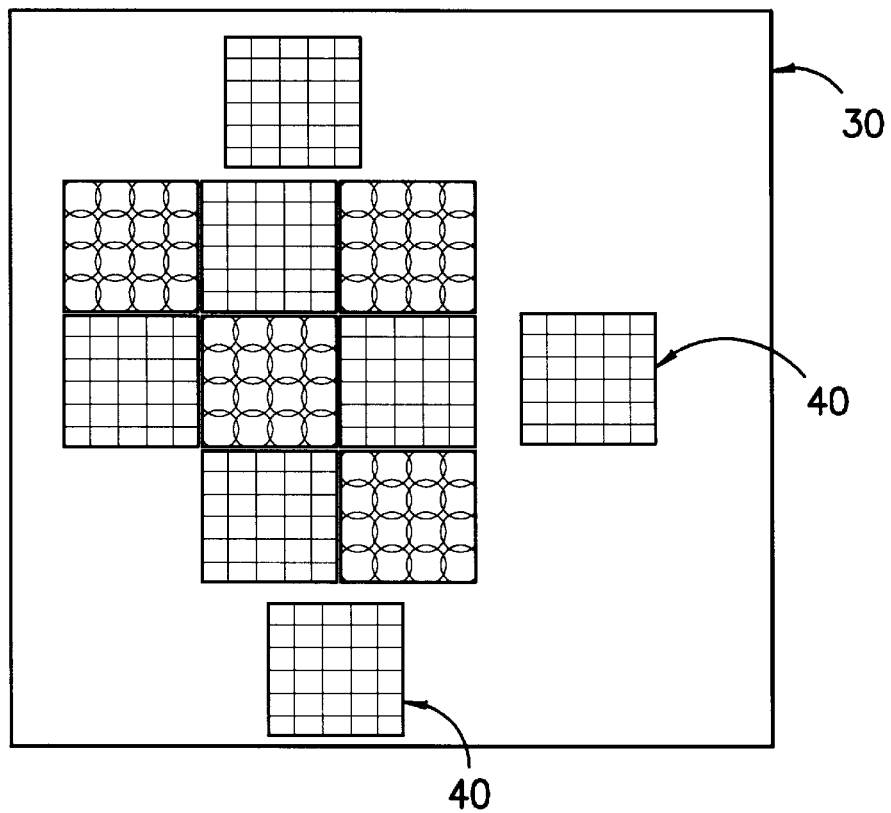
FIG. -11-

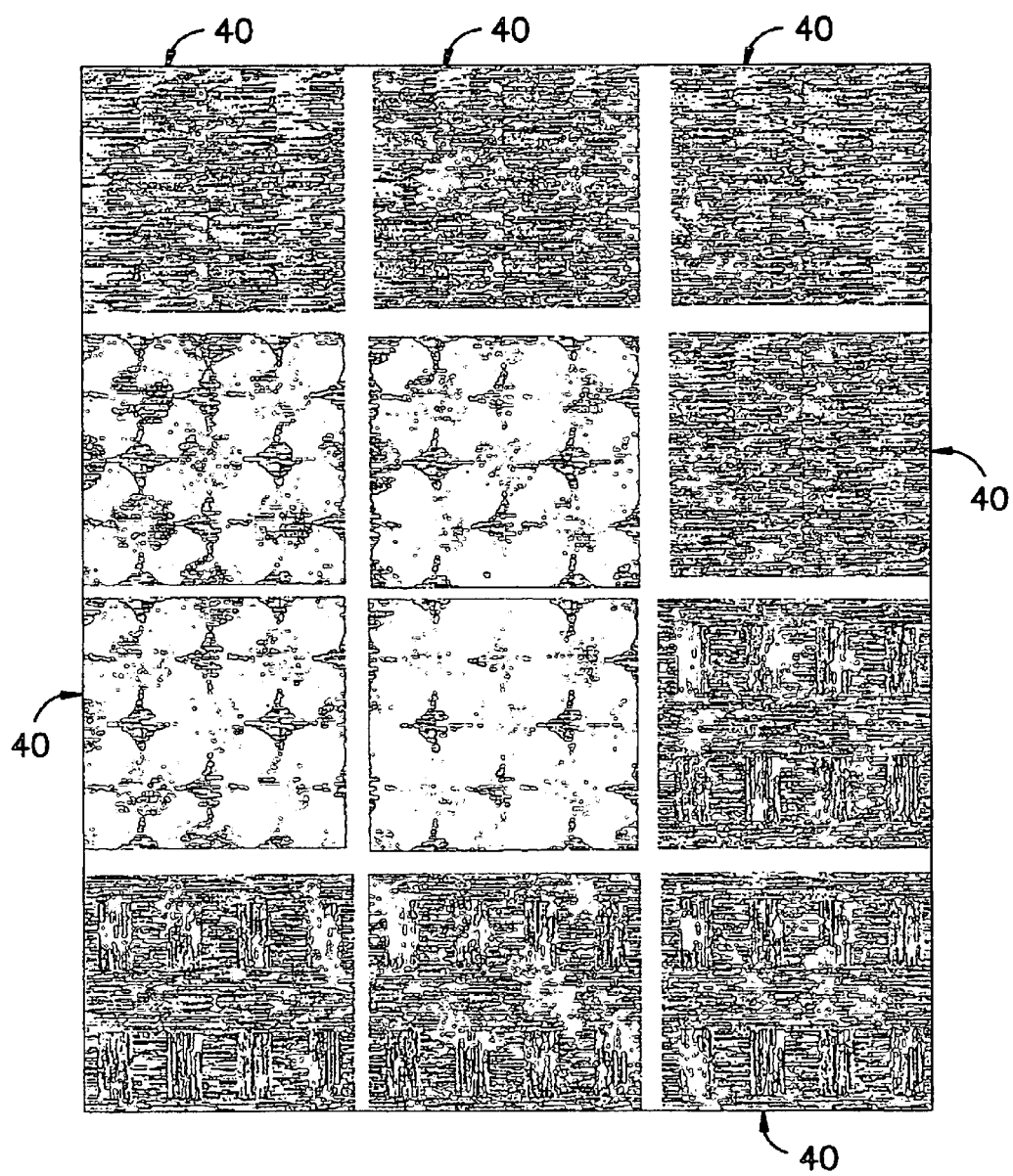
FIG. -12-

US 6,790,042 B2

FLOOR COVERING INSTALLATION SIMULATION SYSTEM AND METHOD

TECHNICAL FIELD

The present invention relates to a system and method for the evaluation of pattern arrangements. More particularly, the present invention is directed to a display system, method and product for presenting and manipulating a plurality of substantially discrete simulated elements incorporating patterns corresponding to patterns to be used on carpeting or other floor covering or surface covering elements. The discrete simulated elements may be manipulated independently of one another to simulate various surface designs and arrangements of potential interest, for example, prior to actual purchase or installation of the floor covering. The discrete simulated elements are held in place relative to one another across a support surface in a substantially releasable manner so as to promote relatively easy manual manipulation and rearrangement by a user of the system.

BACKGROUND OF THE INVENTION

Conventional evaluation of floor covering or flooring products such as carpeting, carpet tiles and area rugs involves a purchaser viewing samples or brochures showing products and patterns of interest and attempting to formulate a mental impression of how the floor covering will ultimately appear in an installed state within the final area of use.

This process may be further complicated in a large commercial installation such as may be present in office environments or expansive public facilities such as airports and the like wherein the floor covering is in the form of arranged patterned carpet tiles. In such installations, the carpet tiles are placed across the flooring surface in substantially adjacent relation to one another so as to appear as a substantially continuous patterned surface. Such installation techniques provide substantial flexibility in terms of developing a desired overall patterned arrangement across the flooring surface. In particular, the use of discrete tile elements permits a plurality of tiles having the same pattern to be arranged adjacent to one another in a so called "monolithic" installation procedure wherein every tile is arranged in a similar relative orientation. It is likewise possible to install the discrete tiles in an orientation wherein a portion of the tile elements are rotated 90, 180, or 270 degrees relative to the adjacent tiles so as to create a slightly different appearance while nonetheless using a single pattern. It is also possible to incorporate tiles with different surface designs in a single installation such that different designs are present at different locations within the installation. Such multi-patterned installations may utilize either "monolithic" or varying placement orientations in the installation process.

While the use of discrete tile products across a flooring surface provides the user with a number of potentially desirable installation options using either a single surface design pattern or multiple surface design patterns, it may be difficult for the user to visualize the coordinated arrangement of discrete elements prior to actual installation. While the use of physical samples of the floor covering material is generally useful, it may be difficult to visualize various combinations of different surface designs and/or placement orientations from such samples. Moreover, if multiple designs are contemplated, it may be time consuming and expensive to produce actual product samples for each contemplated design. Further, numerous actual 36 inch×36 inch full size carpet tile samples are heavy, bulky and cumbersome to transport to or from each customer and difficult for customers to manipulate. Finally, typical floor covering samples are not configured for mounting on a common support surface for manipulation and evaluation of different designs and/or orientation combinations.

Hence, there is a need for an improved system and method for evaluating potential floor covering pattern arrangements or installations prior to the floor covering products actually being purchased or installed.

SUMMARY OF THE INVENTION

The present invention provides advantages and alternatives over the prior art by providing a system, method and/or product whereby a user such as a prospective purchaser of floor coverings or other surface coverings may engage in the contemporaneous physical manipulation and evaluation of various combinations of surface patterns and/or placement orientations for floor covering elements prior to actual purchase or installation.

According to one aspect of the present invention a display system for simulating a floor covering pattern arrangement or installation is provided. The display system includes a support surface and a multiplicity of discrete manually manipulatable patterned simulated floor covering tile elements having a shape substantially corresponding to the shape of carpet or other floor covering tiles such as ceramic tile or the like to be used in the proposed installation thereby substantially simulating the shape of such floor covering tiles. The manipulatable patterned elements include surface designs substantially corresponding to available surface designs of floor covering tiles for potential use in the actual installation. The size and shape of the design elements in the surface designs across the simulated tile elements substantially correspond to the design patterns on the actual floor covering tiles in terms of relative size and shape such that the simulated tile elements appear as substantially complete but reduced versions of the patterns across the actual floor covering tiles. At least a portion of the manipulatable simulated tile elements may have surface designs, patterns, or colors different from other of the simulated tile elements. The simulated tile elements are preferably releasably attachable to the support surface such that they may be placed in selected pattern arrangements across the support surface and thereafter held at a defined position on the support surface. The simulated tile elements may thereby be arranged, rearranged, and held in place in a patterned arrangement across the support surface substantially corresponding to proposed arrangements of floor covering tiles across an underlying flooring surface in the proposed floor covering installation.

According to another aspect of the invention, a collection of manually manipulatable simulated floor covering tile elements incorporating designs substantially corresponding to designs present across floor covering tiles of possible interest to a purchaser is provided. The simulated floor covering tile elements include a show surface including a surface design corresponding substantially to an available surface design for a carpet or other floor covering tile product. The simulated floor covering tile elements further include an attachment surface disposed below the show surface for releasable attachment to a support structure so as to simulate disposition of floor covering tiles across a flooring surface. The attachment surface may comprise a magnetic material releasably attachable to a metallic support surface. The attachment surface may also comprise a multiple use releasable adhesive or one half of a hook and loop fabric attachable to a complimentary half of a hook and loop fabric disposed across a support surface. The simulated floor covering tile elements may be attached across the support surface in various arrangements corresponding to potentially desired floor covering tile arrangements in a floor covering installation and thereafter may be manually manipulated to yield various alternative arrangements for substantially contemporaneous evaluation of multiple prospective designs and/or installation arrangements.

Also, the support surface or structure may be held in various orientations without the releasably attached tile elements falling off. Moreover, the display system or product may be mounted on a wall in a vertical orientation with the tile elements attached to a front surface thereof.

According to another aspect of the present invention, a method of generating a simulated surface covering or floor covering installation is provided. In accordance with the method, one or more surface patterns corresponding substantially to surface patterns for available floor covering tile products are printed across a plurality of manually manipulatable simulated tile elements such that each simulated tile element is patterned across a show surface with a patterned design substantially corresponding to a patterned design present on an actual carpet tile or other floor covering tile element of interest to a user. The simulated tile elements are thereafter releasably attached across a support surface in a pattern substantially corresponding to a prospective arrangement of actual floor covering tile elements across a flooring surface. The simulated tile elements may thereafter be rearranged in one or more alternative patterned arrangement to simulate other prospective installation arrangements.

BRIEF DESCRIPTION OF THE DRAWINGS

The accompanying drawings which are incorporated in and which constitute a part of this specification illustrate certain exemplary and potentially preferred embodiments of the invention and, together with the general description of the invention given above, and the detailed description set forth below, serve to explain the principles of the invention wherein:

FIG.1 is a perspective view of a display system in accordance with one embodiment of the present invention;

FIG. 2 is a cross sectional view taken generally along line 2—2 in FIG. 1;

FIG. 3 is a perspective view of a display system in accordance with another embodiment of the invention;

FIG. 4 is a perspective view of a display system in accordance with still another embodiment of the invention;

FIGS. 5–9 are plan views of simulated tile arrangements in accordance with selected exemplary floor covering installation preview procedures of the present invention;

FIG. 10 is a perspective view of a display system in accordance with one example of the present invention;

FIG. 11 is a plan view of a display system in accordance with a particular example of the present invention; and FIG. 12 is a top plan view of a sheet of printable magnetic material having a plurality of tile patterned representations printed thereon prior to segmentation.

While the invention has been illustrated and will be hereinafter be described in relation to certain potentially preferred embodiments, practices and procedures, is to be understood that the invention is in no way to be construed as limited to such embodiments, practices or procedures. To the contrary, it is anticipated that modifications may be made and that other embodiments of the principles of the invention may occur to those skilled in the art to which this invention pertains. Therefore, it is the intent of the applicants to cover all such modifications and embodiments as may incorporate such principles broadly within the true spirit and scope of the invention as disclosed and claimed herein.

DETAILED DESCRIPTION OF THE INVENTION

Referring now to the drawings, wherein like reference numerals designate like elements throughout the various views, in FIG. 1 there is illustrated an exemplary display system 20 for the presentation and manipulation of a simulated floor covering installation. As illustrated, the display system 20 includes a support element or base 30 and a plurality of manually manipulatable simulated surface covering or floor covering tile elements 40. The simulated floor covering tile elements 40 are preferably substantially reduced image and shape reproductions of carpeting, ceramic, vinyl or other floor covering tile elements of interest to a prospective purchaser of such products.

As shown, each of the simulated tile elements 40 preferably includes a show surface 42 and an attachment surface 44. Each show surface 42 incorporates a surface design pattern. According to the potentially preferred practice, the surface design pattern across the show surface 42 of each simulate tile element 40 preferably corresponds substantially to a surface pattern for a carpet or other floor covering tile element for potential use in a final actual floor covering installation. As will be appreciated, actual floor covering tiles are typically substantially square in geometry with carpet tiles having dimensions in the range of about 12 inches×12 inches, 36 inches×36 inches, or greater. However, carpet tiles may also have any number of other geometries and sizes (octagonal, triangular, rectangular, etc.) as may be useful in facilitating installation and use. Accordingly, while the simulated floor covering tile elements 40 are illustrated as being substantially square corresponding to a greatly reduced version of a typical carpet tile, it is likewise contemplated that the simulated tile elements 40 may also be of any other geometry corresponding to the floor covering tile products of interest. Preferably, the surface design patterns across the show surface 42 of the simulated floor covering tile elements 40 corresponds substantially to the actual surface design patterns across actual prospective floor covering tile elements. That is, the show surface 42 of the simulated floor covering tile elements 40 preferably corresponds to a substantially complete but reduced version of the surface design pattern across the floor covering tile element being simulated.

Although the present invention finds special applicability to carpet tiles, the arrangement or pattern presented by the elements 40 may correspond to a selected pattern or arrangement printed or dyed on a textile substrate such as a carpet substrate for broadloom, area rug, runner, or floor mat, or a fabric substrate for wall coverings, panel coverings, and the like.

According to a potentially preferred practice, the simulated floor covering tile elements 40 are produced by printing the surface design patterns of the actual floor covering tile elements of interest across a printable magnetic sheet. Most preferably, an array of surface patterns for multiple tile elements may be printed across a single magnetic sheet in the manner such as illustrated in FIG. 12. By way of example only, and not limitation, it is contemplated that such designs may be applied via a computer controlled color ink jet printer using a commercially available white printable magnetic sheet such as ink jet magnet sheet material product number 3270™ available from Avery Dennison Corporation printed on with an Epson Stylus 750 ink jet printer. In practice, the surface design patterns across the show surfaces 42 of the simulated tile element 40 may be acquired in the form of digital images in JPEG or other suitable format from a library of available designs maintained by a manufacturer or distributor of the floor covering tile elements of interest. Such libraries are preferably accessible via the Internet and may be downloaded using image acquisition software such as ADOBE ACROBAT or the like. As illustrated in FIG. 12, upon printing of the image array, there is preferably some separation between the discrete images so as to permit segmentation of the sheet to yield a plurality of substantially discrete independently manipulatable simulated floor covering tile elements 40 as illustrated in FIG. 1.

The designs, patterns, and/or colors may be printed on the show surface 42 of the tiles 40 by a color laser printer, ink jet printer, bubble jet printer, photocopy machine, screen printer or the like. Also, they may be produced photographically or manually.

As best shown in FIGS. 1 and 2, according to the potentially preferred practice of the present invention wherein tile images are printed across a magnetic sheet material, the resultant simulated floor covering tile elements 40 may be magnetically attached across the surface of the support element 30 in an arrangement substantially corresponding to a proposed arrangement of floor covering tiles across a flooring surface in the installation being simulated. Preferably, the support element 30 includes a substantially planar face surface 32 of a character such that there is a magnetic attraction between the face surface 32 and the underside 44 of the simulated tile elements 40. One material for use as the face surface 32 is a very thin gauge steel or other iron based alloy which is of substantially light weight and may be formed around a perimeter frame 34 (FIG. 2) of wood, plastic, or the like so as to reduce weight thereby making the support element 30 highly portable. Also, the light weight of support element or base 30 allows the device 20 to be readily and easily manually manipulated, handed from person to person, laid on top of other items, and hung on a wall.

According to one preferred feature of the present invention, the simulated floor covering tile elements 40 are releasably attachable to the face surface 32 of the support element 30 such that they may be readily manipulated by hand to simulate a number of different arrangements of various prospective floor covering tile elements. The evaluation of various simulated installation alternatives is facilitated by the releasable attachment of the simulated floor covering tile elements since the relative positions of each tile element may be maintained unless and until such elements are actively moved for purposes of evaluation of a different configuration and/or combination of surface designs of the same tiles or different tile elements. Thus, one or more of the individual simulated floor covering tile elements may be moved within an arrangement without substantially disturbing the others. In this way, multiple alternative installations may be rapidly and easily simulated. Such simulation of patterns, arrangements, configurations, combinations, etc. facilitates the user's visualization and appreciation thereof. This is especially adapted to facilitate a user's visualization of patterned carpet tile. Without such an aid, it is difficult for individuals to visualize such patterned carpet tile patterns, arrangements, etc.

By way of example only, and not limitation, an exemplary use of the system according to the present invention is illustrated in FIGS. 5–9. As shown in FIG. 5, four substantially identical simulated carpet tile elements 140, 240, 340, 440 are arranged in a so-called "monolithic" orientation relative to one another such that the surface design patterns across each of the simulated carpet tile elements are arranged in a repeating substantially identical orientation.

In FIG. 6, the simulated carpet tile elements 140, 240, 340, 440 as shown in FIG. 5 have been arranged in a slightly different manner wherein the simulated tile elements 240 and 440 have been rotated clockwise 90 degrees. This rotation of the elements may be performed by simple manual manipulation. As shown, such a change gives rise to a substantially different overall appearance to the pattern arrangement.

In FIG. 7, a plurality of substantially discrete simulated carpet tile elements 540, 640, 740, 840 are arranged in a pattern to simulate a monolithic carpet tile installation.

In FIG. 8, both of the upper simulated carpet tile elements 540, 640 in FIG. 7 have been rotated 180 degrees to simulate the appearance of rotating the carpet tiles at alternating rows of an actual installation. Again, this manipulation of the tiles gives a different overall appearance.

In FIG. 9, an arrangement of simulated carpet tile elements 940, 1040, 1140, and 1240 is illustrated wherein multiple design patterns are present in a single arrangement. Such an arrangement thus simulates the use of multiple carpet tile elements incorporating multiple designs in a common installation.

With respect to FIG. 1 of the drawings, the tile elements are laid out with alternating designs in a checkerboard-like arrangement.

One benefit of the preferred system 20 according to the present invention is the ability to view a simulated floor covering installation from a number of different angles. This ability is facilitated by the fact that the simulated floor covering tile elements 40 are attached to the support element 30 with sufficient attractive force that a stable static system is established between the simulated floor covering tile elements 40 and the support element 30. That is, the support element 30 may be picked up and/or rotated without disturbing the attached simulated tile elements 40. This feature thus permits a user to view a simulated arrangement of floor covering tile elements from a substantially flat plan perspective as illustrated in FIG. 11 as well as from various elevation perspectives as illustrated in FIG. 10. As will be appreciated, such elevation perspectives may be useful in simulating the appearance of the floor covering installation to a user walking across the floor covering once installation has taken place.

It is contemplated that a person skilled in the art may make modifications to the embodiments shown herein within the scope and intent of the present invention. By way of example only, one alternative display system 20' is illustrated in FIG. 3 which incorporates a substantially flat panel support element 30' including a substantially planer face surface 32' across which a plurality of simulated tile elements 40' may be releasably attached. As shown, in this embodiment, the support element 30' is of a generally thin profile to facilitate mobility and ease of handling. Of course, if desired such a support element 30 may also be mounted in substantially stable stationary relationship on a wall or other viewing surface for purposes of manipulation and evaluation of the simulated tile elements 40'.

With reference again to FIG. 3, the tiles 40' are oriented in a checkerboard arrangement of different designs and with 90-degree rotation of adjacent tiles.

In accordance with one example of the present invention, the display device may include a support element or base having a face surface with dimensions of about 8-½ inches×11 inches which will support about 12 square tiles having show face dimensions of about 2 inches×2 inches.

In accordance with another example, a display system or product has a face surface with dimensions of about 12 inches×12 inches, a thickness of about ⅝ inches or less, and can support up to about 36 square tiles having show face dimensions of about 2 inches×2 inches, or about 16 square tiles having face dimensions of about 3 inches×3 inches. It is preferred that the releasable tiles have a thickness of less than ¼ inch, more preferably less than ⅛ inch, most preferably about 1/32 an inch or less.

FIG. 4 illustrates yet another alternative embodiment of the invention wherein the display system 20" is substantially similar to that illustrated in FIG. 3 but wherein the support element 30" includes a finger grip opening 34" or handle to facilitate carrying by a user. In all other respects, the display system 20" functions in the same manner as the display system 20' in FIG. 3 such that the simulated floor covering tile elements 40" are releasably attached across the face surface 32" for evaluation and manipulation by a user.

With reference to FIG. 4, each of the tiles has the same pattern or design thereon and in the same orientation. Such designs may be printed on the tiles so that the design or pattern of adjacent tiles match up or are in accurate registration. This can facilitate the visualization of a carpet tile installation or arrangement of complex designs or patterns which accurately match or register with that of adjacent tiles. Also, this can facilitate the visualization of a broadloom product or the like.

While the use of magnetic materials to form the simulated floor covering tile elements 40 may represent a potentially preferred practice, it is to be understood that the present invention is in no way limited to display systems which utilize magnetic attraction between the simulated floor covering tile elements 40 and the support element 30. To the contrary, it is contemplated that the present invention is likewise adaptable to any number of other mechanism for establishing the releasable attachment of the simulated tile elements 40 to the support element 30. By way of example only, and not limitation, one such other mechanism as may be utilized may incorporate the use of a releasable adhesive across the underside of the simulated tile elements 40. In another example, respective complementary components of a releasable adhesive system may be incorporated on the back of the tile elements and the face of the support element or base. By way of further example, it is contemplated that another mechanism which may be utilized is a complimentary hook and loop fabric system wherein the face surface 32 of the support element 30 is covered with one-half of a hook and loop fabric while the underside of the simulated tile elements 40 includes the other side of the hook and loop fabric such that the simulated floor covering tile elements 40 may be held against the face surface 32 of the support element by the interactive relation of the two complimentary portions of the hook and loop fabric.

In accordance with one aspect of the present invention, there is provided an improved method of marketing patterned carpet tile and/or carpet designs and design arrangements by using the display system of the present invention. Also, a potential customer may be shown a multitude of patterns, designs, arrangements, etc. by having a salesperson supply the customer such as a designer or architect with a display system having a plurality of tile elements and a support element or base. This marketing approach is preferred over the conventional approach of using actual carpet tile samples or brochures showing such tiles. Further, the customer can arrange and rearrange the tile elements at their leisure and as they see fit and thereby enjoy the experience of designing a floor covering installation.

The display system and method of the present invention is especially well suited for the marketing of patterned carpet tile products manufactured and marketed by Milliken and Company of LaGrange, Ga. Such patterned carpet tile products provide for precise modulation, 100% pattern match, dye injection printing of designs, patterns and/or colors, custom designs and images, printing of individual tiles, a myriad of installation options (mosaic, rotations, patchworks, insets, monolithic, etc.), coordinates of different designs, patterns, colors, solid borders, and the like.

The display system of the present invention helps sales reps to use any carpet tile and helps the customer understand their options.

The system provides ease and flexibility.

For example:

Sales Rep John Doe, is working on the ACME project with Design Firm, Inc.

John finds that Designer A likes pattern 1 and pattern 2.

He prints up design JPEGS on magnetic paper that he buys at plain old office store using his own computer and printer.

He cuts up the designs into magnet tiles and brings them in with the magnetic board to show to Designer A.

Designer A now can use the magnet tiles to look at all sorts of different options for installing patterns 1 and 2.

She finds that she wants to use a monolithic installation, and also a 180-degree type of installation.

John also finds that Designer B likes patterns 1, 2 and 3.

He goes back to the office or home, prints up more pattern tiles and brings them back for Designer B to use.

Designer B chooses a mosaic installation utilizing all three patterns.

John may never use these patterns again, but instead of a huge and expensive process, he has now spent only about 1.5 hours and $5 dollars to show something that traditionally takes weeks and hundreds of dollars. It does not matter which particular designs are a part of the process as the intention is that there will hopefully be hundreds of different and new designs in use each day.

In accordance with another example, a customer decides that they want to work with Milliken and Company and chooses a few patterns that they would like to work with. A Milliken and Company sales rep brings in plots, magnet tiles printed up on the rep's computer, and a board. The customer plays . . . all options are explored in a fun manner within minutes. Complexity is reduced. Then, a decision is made and product ordered. The customer can keep the plots, magnet tiles and board.

The display system, method and/or product of the present invention can reduce marketing cost, speed up the marketing process, enhance the customer's or buyer's experience, facilitate a better understanding of the product offering, and/or the like.

In accordance with selected embodiments of the display system of the present invention, the simulated tile elements are releasably attached to the display face of the support element by, for example, magnetic attraction, hook and loop fastening means, adhesive means, electrical charge, co-active vinyl, and adhesive tape.

In one embodiment, the invention is directed to a system having removably affixed textile patterns to display design configurations. The display system includes a rigid display panel, and removably affixed textile pattern pieces.

The textile pattern pieces may be affixed by hook and loop fastener material, repositionable adhesive tape, by having the backboard metallic and tiles magnetic, by having the backboard magnetic and tiles metallic, or by having the backboard and pattern co-active vinyl.

In one embodiment, the invention is directed to a method of removably affixing and positioning textile patterns on a panel through the means of co-active materials. The co-acting materials to attach samples to the display panel may be hook and loop fastener, removable and repositionable adhesive tape, a metallic backboard and magnetic tiles, a magnetic backboard and metallic backed tiles, or co-active vinyl backboard and pattern pieces.

The present invention is directed to a display system and related method permitting a prospective purchaser of floor coverings to engage in the contemporaneous physical manipulation and evaluation of various combinations of surface patterns and/or placement orientations for floor covering tile elements prior to actual purchase or installation. Simulated tile elements having surface patterns corresponding to the surface patterns of the actual floor covering tile elements are disposed across a display surface in a releasably attachable manner such that one or more of the simulated tile elements may be rotated or replaced to simulate at least one alternative arrangement.

It is believed that the present invention provides a new and useful system, method and/or product for the rapid and cost effective evaluation of multiple potential floor covering alternatives. While specific embodiments of the present invention have been illustrated and described, it is to be understood that the invention is in no way to be limited to any such illustration and described embodiments since modifications may be made and other embodiments of the principles of this invention may occur to those of skill in the art to which this invention pertains.

For example, the tile elements may have a paper face, textile face, film face, or the like. The face material preferably allows for printing of selected designs, patterns, or colors thereon. However, solid color tile elements (such as border tile) may be made with precolored paper, textile or film material on the face thereof. Therefore, it is intended by the appended claims to cover all such modifications and other broad principles of this invention within the true spirit and scope thereof.

What is claimed is:

1. A display system for simulated presentation of a plurality of alternative arrangements of prospective floor covering elements across a flooring support surface, the display system comprising:

a support element including a substantially planar display face; and a plurality of independently manually manipulatable simulated elements, wherein each of said simulated elements have a rectangular shape substantially corresponding to the shape of the prospective floor covering elements and wherein said simulated elements further include a show surface including a surface design pattern comprising a reduced reproduction of a surface design pattern of at least one prospective floor covering element, said simulated elements being releasably attachable across the display face of the support element with the show surface facing away from the display face of the support element such that said simulated elements are independently manipulatable, rotatable, and arrangeable in a manually manipulatable abutting array across the display face to simulate a first prospective arrangement of the prospective floor covering elements and such that said manually manipulatable array is alterable by means of manually rearranging at least one of the manually manipulatable elements to simulate at least a second prospective arrangement of the prospective floor covering elements, wherein said simulated elements comprise printed segments of a printable magnetic sheet material.

2. The display system as recited in claim 1, wherein the display face of the support element comprises a material having a magnetic attraction to the printable magnetic sheet material.

3. The display system according to claim 1, wherein the support element includes a handle.

4. The display system according to claim 3, wherein the handle comprises a finger acceptance opening extending through the support element display face.

5. The display system according to claim 1, wherein said simulated elements are substantially square.

6. The display system according to claim 1, wherein the show surface of each of the simulated elements is substantially identical.

7. The display system according to claim 1, wherein at least one of the simulated elements has a show surface including a surface design pattern which differs from at least one other of the simulated elements.

8. A display system for the simulated presentation of a plurality of alternative arrangements of prospective floor covering tile elements across a flooring support surface, the display system comprising:

a support element including a substantially planar display face; and a plurality of independently manually manipulatable simulated tile elements comprising printed reduced dimension reproductions of the prospective floor covering tile elements, wherein said simulated tile elements have a rectangular shape substantially corresponding to the shape of the prospective floor covering tile elements and wherein said simulated tile elements further include a show surface including a surface design pattern comprising a substantially complete reduced reproduction of a surface design pattern of at least one prospective floor covering tile element, said simulated tile elements being releasably attachable across the display face of the support element with the show surface facing away from the display face of the support element such that said simulated tile elements are independently manipulatable, rotatable, and arrangeable in a manually manipulatable abutting array across the display face to simulate a first prospective arrangement of the prospective floor covering tile elements across a flooring surface and such that said manually manipulatable array is alterable by manually rearranging at least one of the simulated tile elements to simulate at least a second prospective arrangement of the prospective floor covering tile elements across a flooring surface, and wherein the attachment force between the display face and the simulated tile elements is sufficient to maintain the relative position of the simulated tile elements within the manually manipulatable array across the display face when the display face is disposed in a substantially vertical position, wherein said simulated tile elements comprise printed segments of a printable magnetic sheet material.

9. The display system as recited in claim 8, wherein the display face of the support element comprises a material having a magnetic attraction to the printable magnetic sheet material.

10. The display system according to claim 8, wherein the support element includes a handle.

11. The display system according to claim 10, wherein the handle comprises a finger acceptance opening extending through the support element display face.

12. The display system according to claim 8, wherein said simulated tile elements are substantially square.

13. The display system according to claim 8, wherein the show surface of each of the simulated tile elements is substantially identical.

14. The display system according to claim 8, wherein at least one of the simulated tile elements has a show surface including a surface design pattern which differs from at least one other of the simulated tile elements.

15. A method for simulating at least one prospective arrangement of floor covering tile elements across a flooring support surface, comprising:

applying a plurality of independently manually manipulatable simulated tile elements across a substantially planar display face in an array substantially corresponding to the prospective arrangement of floor covering tile elements across a flooring support surface, wherein said simulated tile elements are rectangular and substantially magnetic in character and include a show surface including a surface design pattern corresponding to a surface design pattern of a prospective floor covering tile element within said prospective arrangement of floor covering tile elements across a flooring support surface, said simulated tile elements being independently releasably attachable, manipulatable and rotatable across the display face by means of magnetic attraction between the simulated tile elements and the display face with the show surface facing away from the display face such that said simulated tile elements are normally held in place relative to one another across the display face but are removable and adjustable by manual manipulation such that said array is alterable to simulate one or more alternative abutting arrangements of floor covering tile elements.

\* \* \* \* \*